US011169707B2

(12) United States Patent
Blount

(10) Patent No.: US 11,169,707 B2
(45) Date of Patent: Nov. 9, 2021

(54) GARBAGE COLLECTION PACING IN A STORAGE SYSTEM

(71) Applicant: NetApp, Inc., Sunnyvale, CA (US)

(72) Inventor: Joseph Blount, Wichita, KS (US)

(73) Assignee: NETAPP, INC., San Jose, CA (US)

( * ) Notice: Subject to any disclaimer, the term of this patent is extended or adjusted under 35 U.S.C. 154(b) by 1002 days.

(21) Appl. No.: 15/004,318

(22) Filed: Jan. 22, 2016

(65) Prior Publication Data

US 2017/0212678 A1 Jul. 27, 2017

(51) Int. Cl.
*G06F 3/06* (2006.01)
*G06F 12/02* (2006.01)

(52) U.S. Cl.
CPC .............. *G06F 3/061* (2013.01); *G06F 3/067* (2013.01); *G06F 3/0659* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 6,185,663 B1 | 2/2001 | Burke | |
| 6,678,809 B1 | 1/2004 | Delaney et al. | |
| 7,363,457 B1 | 4/2008 | Dekoning et al. | |
| 7,792,802 B1 | 9/2010 | Rao | |
| 7,860,836 B1 | 12/2010 | Natanzon et al. | |
| 8,250,324 B2 | 8/2012 | Haas et al. | |
| 8,806,115 B1 | 8/2014 | Patel et al. | |
| 8,826,273 B1 | 9/2014 | Chen et al. | |
| 9,128,820 B1* | 9/2015 | Malina | G06F 16/1847 |
| 9,372,743 B1 | 6/2016 | Sethi et al. | |
| 9,569,452 B1 | 2/2017 | Mikula | |
| 2007/0100917 A1 | 5/2007 | Amano et al. | |
| 2009/0300086 A1 | 12/2009 | Bacon et al. | |
| 2010/0122148 A1 | 5/2010 | Flynn et al. | |
| 2011/0126045 A1* | 5/2011 | Bennett | G06F 11/1068 714/6.22 |

(Continued)

OTHER PUBLICATIONS

PCT Search Report and Written Opinion, Application No. PCT/US17/14111, 15 pages.

(Continued)

*Primary Examiner* — Amresh Singh
(74) *Attorney, Agent, or Firm* — Klein, O'Neill & Singh, LLP

(57) ABSTRACT

A system and method for improving storage system performance by reducing or avoiding load spike amplification when performing garbage collection is disclosed. A storage controller in a storage system tracks system load including write load and read load, as well as available free segments. The storage controller uses these tracked values as inputs and, with these inputs, generates a garbage collection rate. Where read load is included, a scaled portion of the read load is taken into consideration so that, as the number of free segments nears the minimum amount desired and to prevent garbage collecting too slowly, the read load is gradually excluded from the garbage collection rate determination. The garbage collection rate is therefore responsive to system load so that, in times of high system load, the rate reduces as much as is safe so that the write load takes priority with computing resources of the storage controller.

20 Claims, 4 Drawing Sheets

(56) References Cited

U.S. PATENT DOCUMENTS

| | | |
|---|---|---|
| 2011/0289380 A1 | 11/2011 | Wilkerson et al. |
| 2012/0066439 A1* | 3/2012 | Fillingim ............ G06F 11/3485 |
| | | 711/103 |
| 2013/0024641 A1 | 1/2013 | Talagala et al. |
| 2013/0332688 A1 | 12/2013 | Corbett et al. |
| 2014/0068219 A1 | 3/2014 | McNutt |
| 2014/0115233 A1 | 4/2014 | Goss et al. |
| 2014/0156965 A1 | 6/2014 | Yang et al. |
| 2014/0237173 A1 | 8/2014 | Cong et al. |
| 2014/0279900 A1 | 9/2014 | Gupta et al. |
| 2014/0310483 A1 | 10/2014 | Bennett et al. |
| 2015/0039577 A1 | 2/2015 | Talagala et al. |
| 2015/0212897 A1 | 7/2015 | Kottomtharayil et al. |
| 2016/0110105 A1* | 4/2016 | Karamcheti ............ G06F 3/061 |
| | | 710/302 |
| 2016/0179386 A1 | 6/2016 | Zhang |

OTHER PUBLICATIONS

International Search Report and Written Opinion for Application No. PCT/US2017/014251 dated Mar. 30, 2017, 18 pages.
International Preliminary Report on Patentability for Application No. PCT/US2017/014111 dated Aug. 2, 2018, 7 pages.
International Preliminary Report on Patentability for Application No. PCT/US2017/014251 dated Aug. 9, 2018, 11 pages.

* cited by examiner

GARBAGE COLLECTION PACING IN A STORAGE SYSTEM

TECHNICAL FIELD

The present description relates to data storage systems, and more specifically, to techniques to improve system operation by appropriately pacing garbage collection to recover storage segments as free space.

BACKGROUND

In some storage systems, such as high-availability storage systems that utilize write-back caching and some form of data redundancy, writes to persist cached data are done sequentially to the long-term storage (e.g., one or more storage devices such as hard disk drives and/or solid state drives) in full stripes. Over time, some data may be changed. For example, a host may write data to a specified logical block address (LBA) at a first point in time and, later, modify or replace the data at the specified LBA. Each time a write is persisted in such systems, it is put into a new location (e.g., a new data stripe). As a result, changed/new data for a specified LBA renders the data in the prior stripe(s) for the specified LBA invalid, which is also referred to as "garbage."

To free up those locations associated with now-invalid data in the long-term storage, some storage systems use a process of garbage collection. In garbage collection, segments (which can be formed of one or more data stripes in a pooled storage system) are identified for collection. These segments are typically identified based on the number of invalid chunks of data they contain (e.g., a segment with more invalid chunks of data may be a more likely candidate for garbage collection). In garbage collection, any valid chunks of data in the target segment are read out from the target segment and written to a new data stripe in a new segment (e.g., sequentially with current write data). Thus, garbage collection is an expensive overhead process that taxes operation of the system by consuming processing and bandwidth resources.

Current approaches toward garbage collection typically rely on matching the production of clean segments (available for use in writing new/updated data) with the consumption of clean segments from an incoming write stream. Thus, the pace of garbage collection in these approaches effectively pins the pace of garbage collection production to the pace of incoming write data. This results in load spike amplification—when the write rate increases, the pace of garbage collection increases. This is less than desirable because it increases the overhead imposed on the storage system for garbage collection at the same time that the load on the system increases from the write rate. This becomes noticeable to the end user in the form of delays.

BRIEF DESCRIPTION OF THE DRAWINGS

The present disclosure is best understood from the following detailed description when read with the accompanying figures.

DETAILED DESCRIPTION

Figure 1:
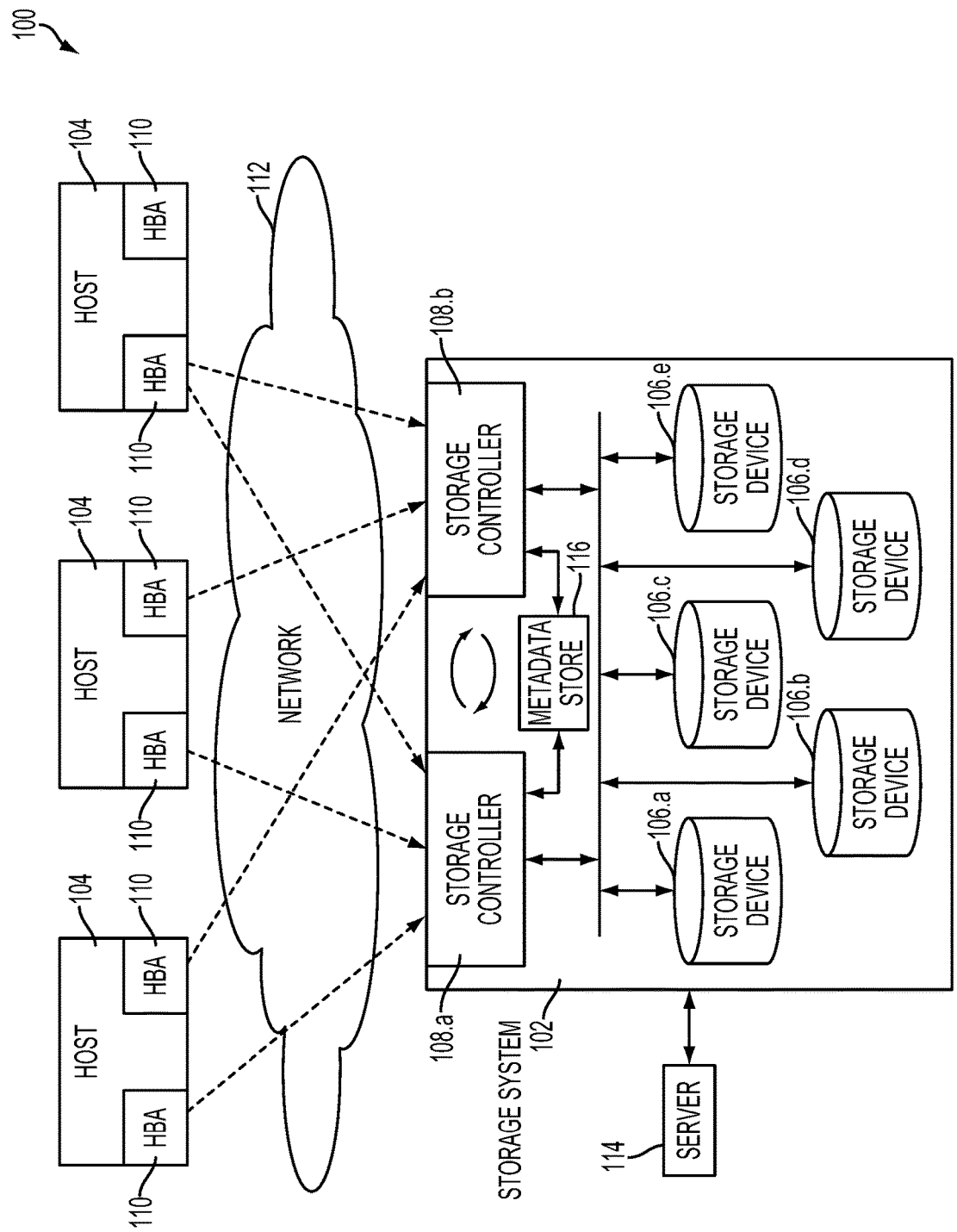
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving storage system performance by reducing or avoiding load spike amplification when performing garbage collection. In an embodiment, a storage controller in a storage system has one or more variables in a garbage collection model that determines a garbage collection rate set/tuned to influence how responsive the model will be to various inputs such as total system load, write load, a number of available free segments. This may be performed at some initial time, or updated during regular I/O operations.

During operation, the storage controller tracks the system load, such as the write load and the read load, and the number of available free segments (such as initially available or subsequently available due to garbage collection activities). The storage controller inputs these tracked values into the model. The model takes these inputs and generates a garbage collection rate to output. In an embodiment where read load is included, the model takes a scaled portion of the read load into consideration so that, as the number of free segments approaches the minimum desired, the read load is gradually excluded from the garbage collection rate determination. This enables the garbage collection rate to continue meeting the need to at least produce enough free segments at times where the consumption of free segments nears and then equals the garbage collection rate and "banked" free segments have already been consumed.

The storage controller takes the garbage collection rate output from the model and, if it differs from the current garbage collection rate, modifies the rate to equal the newly output rate. This repeats continuously or periodically during I/O operations. Thus, according to embodiments of the present disclosure garbage collection may proceed at higher rates (e.g., to "bank" up free segments) at times of low system load/idle and proceed at lower rates (or stop) at times of high system load. The storage controller, with the model, produces gradual changes in the garbage collection rate so as to provide smooth adjustments to system changes. Further, the storage controller, with the model, produces good marginal behavior, for example enabling the increase/decrease in garbage collection rate to match what may be intuitively desirable.

FIG. 1 illustrates a data storage architecture 100 in which various embodiments may be implemented. Specifically, and as explained in more detail below, one or both of the storage controllers 108.a and 108.b read and execute computer readable code to perform the methods described further herein to determine a pace for garbage collection as a function of a current load on the system and an amount of free segments (to ensure that the amount of free segments available is consistent with the consumption of free segments by a write stream).

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a DDP, volume data, protection information, and spare capacity are distributed across all of the storage devices included in the pool. As a result, all of the storage devices in the DDP remain active, and spare capacity on any given storage device is available to all volumes existing in the DDP. Each storage device in the DDP is logically divided up into one or more data extents (which may also be referred to as blobs herein) at various block addresses of the storage device. A data extent (or blob) is assigned to a particular data stripe of a volume.

An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes. Further, according to embodiments of the present disclosure, one or more data stripes may compose a given segment as used herein (i.e., a segment may include some integer number of data stripes).

In addition, the storage system 102 may also include a metadata store 116. The metadata store 116 may be composed of one or more storage devices, such as one or more solid-state devices. In an embodiment, the metadata store 116 may also be grouped using DDP as a virtualization technique. The metadata store 116 may serve to store metadata regarding data (e.g., written from one or more hosts 104) in the storage devices 106. In an embodiment, write data may be received from one or more hosts 104 and momentarily stored in a write-back cache of the storage system 102, e.g. using LBAs. The metadata store 116 may house one or more types of metadata to facilitate translating the specified LBAs of the data in the write-back cache to block addresses used by the storage devices 106.

For example, the metadata store 116 may include a tree data structure metadata store to house a tree data structure that facilitates translation of a specified volume/LBA to a blob identifier (blob ID). A blob in this example includes the basic unit that maps to the contents of a given write I/O from a host (thus, may be arbitrarily sized from a minimum specified size to a maximum specified size). Each blob ID may be randomly generated, for example. The metadata store 116 may also include a global index that houses a mapping between blob IDs and block addresses (the physical locations) used for the storage devices 106, as well as other information such as a reference count that may track how many times the particular data is referenced in the tree data structure (for example). The global index may include one or more partitions, and a portion of the blob ID may be used to identify what particular partition should be accessed for a given blob.

A different portion of the metadata store 116 may be used for the different entities mentioned above, such that a first portion may be a repository for the tree data structure and have its own DDP structure. A second portion may be a separate repository for the global index and also have its own DDP structure. The different information destined for the metadata store 116 (e.g., tree data structure and/or global index information) may be addressed into the metadata store 116 with metadata block addresses associated with metadata objects. When a new version of data already stored in one or more of the storage devices 106 is received at the storage system 102 for storage, according to embodiments of the present disclosure that data may be written to a new segment (e.g., where all data is currently being sequentially written). As a result, the old mapping in the tree data structure may be removed, and a dereference sent to the global index. The global index decrements the reference count for the block address where the data is stored in the storage devices 106.

If the reference count reaches a selected value, such as 0, then the data stored there is identified as garbage (invalid). The block addresses that have become garbage may be tracked on a per-segment basis to assist in identifying garbage collection candidates over time according to embodiments of the present disclosure. A segment as used herein may refer to a unit of storage that garbage collection is performed on, and may include one or more data stripes (e.g., an integer number). The number of data stripes in a segment may vary, such as influenced by system capacity (e.g., 10 GB or more in some embodiments). Of course, various embodiments may use any appropriate size for a segment or a data stripe.

In the present example, storage controllers 108.a and 108.b are arranged as an HA pair. Thus, when storage controller 108.a performs a write operation for a host 104, storage controller 108.a may also sends a mirroring I/O operation to storage controller 108.b. Similarly, when storage controller 108.b performs a write operation, it may also send a mirroring I/O request to storage controller 108.a. Each of the storage controllers 108.a and 108.b has at least one processor executing logic to perform garbage collection techniques according to embodiments of the present disclosure.

Moreover, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1 without departing from the scope of the present disclosure.

With respect to the hosts 104, a host 104 includes any computing resource that is operable to exchange data with storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108.a, 108.b). It is understood that the scope of present disclosure is not limited to either block-level or file-level protocols or object-based protocols, and in many embodiments, the storage system 102 is responsive to a number of different memory transaction protocols.

According to embodiments of the present disclosure, the storage system 102 may maintain a model that is used to determine the garbage collection rate based on multiple inputs including the current system load and the amount of currently available segments in the storage devices 106. For example, one or both of the storage controllers 108.a, 108.b may use and maintain the model according to embodiments of the present disclosure.

Figure 2:
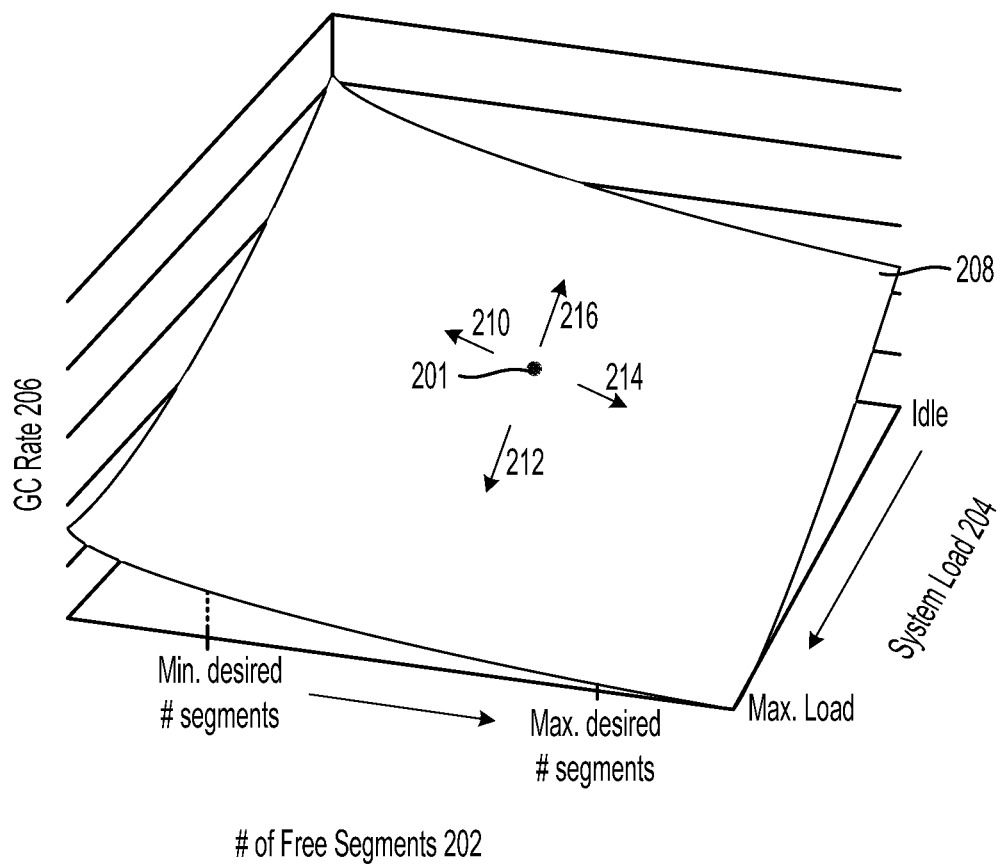
FIG. 2 illustrates an exemplary model according to aspects of the present disclosure.

FIG. 2 illustrates an exemplary such model 200 according to aspects of the present disclosure. The model 200 in FIG. 2 is illustrated in the form of a graph for ease of illustration of some of the principles herein.

The graph in FIG. 2 is a three-dimensional graph, with the axis 202 (also referred to herein as the y-axis) representing the free number of segments available to the storage system 102 at a point in time (e.g., the current point in time or near-current point in time). The axis 204 (also referred to herein as the x-axis) represents the system load on the storage system 102 at the point in time. As used herein, the system load may correspond to a variety of different metrics (either alone or in combination). These may include a current CPU utilization (e.g., measured as an idle percentage, for example of the worst of any core not devoted to garbage collection), disk bandwidth, and memory bandwidth to name just a few examples. Further, this may include only writes in some embodiments, while in other embodiments reads are taken into consideration and potentially other aspects such as compliance with service level agreements and flash read cache interactions. The axis 206 (also referred to herein as the z-axis) represents the resulting garbage collection rate at the point in time as a result of the system load and number of free segment inputs (and, in some embodiments, additional inputs that will be discussed further below).

Thus, as illustrated from the model 200, the garbage collection rate may be determined based on the current system load measured by the system (e.g., by one or both of the storage controllers 108.a, 108.b) and the current number of free segments available for new writes as measured/tracked by the system. The model 200 as illustrated may be generated according to several different types of models. In an embodiment, the surface plot 208 illustrated in the model 200 is generated according to the following expression:

$$\text{Garbage Collection Rate} = \text{LoadHeadRoom}^X + \text{FreeSegmentHeadRoom}^Y. \quad \text{(Eq. 1)}$$

This is an exemplary equation only. The values for X and Y may be set before the storage system 102 is deployed, for example as part of calibrating the model illustrated in FIG. 2 according to the specific characteristics of the system 102 (e.g., particular hardware configuration, firmware configuration, etc.). These may be tunable, for example, to modify how responsive the system is to different inputs (including available free space and write load according to FIG. 2). In Equation 1, the load head room corresponds to a gap determined between the current system I/O load and a maximum possible system I/O load determined or set for the system. Thus, for example, the axis 204 that represents system load may in an embodiment represent the difference between the maximum load and the current load, such that "max load" in FIG. 2 corresponds to a zero (or near-zero) difference between the maximum specified load and the current load.

Further, in an embodiment the free segment head room corresponds to a gap determined between the current number of free segments and a maximum desired number of free segments determined or set for the system. Thus, for example, the axis 202 representing free segments may, in an embodiment, in particular represent the difference between the maximum desired number of free segments and a current number of free segments in the system. In this embodiment, the "max desired # of free segments" in FIG. 2 corresponds to a zero (or near-zero) difference between the maximum desired number of free segments and a current number of free segments.

In practice, a storage controller 108 monitors and/or receives updates (e.g. periodically or continuously) regarding the overall status of the storage system 102, including the current system load (e.g., a reported write load) and current number of free segments in the storage devices 106. Such information may be in the form of system counters or other appropriate data. This information may be input into the model as it is received, or after a short delay, into the model. The model produces as an output a garbage collection rate that the storage controller 108 then implements. In an embodiment, this is done in real time or near to real time, while in another embodiment the storage controller 108 may delay for a short period of time before implementing.

This is illustrated by the surface plot 208 in FIG. 2. For a given set of values, a resulting point 201 on the surface plot 208 is reached, corresponding to a particular z-axis 206 value that represents, or corresponds to, the garbage collection rate that should be implemented. Further, as can be seen, if for the given system load 204 at which the point 201 is located the number of available free segments reduces, then the point 201 shifts in the direction 210 as the storage controller 108 inputs updated free segment information (i.e., the new values for how many free segments there now are in the system). As the point 201 shifts in direction 210, as illustrated in FIG. 2 the point 201 follows the surface of the surface plot 208 upward (in the z direction), corresponding to an increase in the garbage collection rate that is output from the model. This is favorable in this situation, for the given system load at the moment, because it utilizes more overhead for garbage collection (e.g., to over-produce free segments for future moments of increased system load) that does not interfere with current system load demands.

As another example, if at a given value for the system load along the x-axis 204 the number of available free segments increases, then the point 201 shifts in the direction 214 as illustrated as the storage controller 108 inputs updated free segment information. As the point 201 shifts in the direction 214, as illustrated in FIG. 2, the point 201 follows the surface of the surface plot 208 downward (in the z direction) corresponding to a decrease in the garbage collection rate that is output from the model. This is favorable in this situation, for the given load at the moment, because it typically will represent times where there are more than enough free segments available compared to the current consumption rate for write I/O.

As yet another example, if at a given value for the number of free segments along the y-axis 202 the system load increases, then the point 201 shifts in the direction 212 as illustrated as the storage controller 108 inputs updated system load information. As the point 201 shifts in the direction 212, as illustrated in FIG. 2, the point 201 follows the surface of the surface plot 208 downward (in the z direction) corresponding to a decrease in the garbage collection rate that is output from the model. This is favorable in this situation because it reduces the burden resulting from the garbage collection processing overhead at a time where the system load has increased (e.g., from an increase in write I/O from one or more hosts 104).

As yet another example, if at a given value for the number of free segments along the y-axis 202 the system load decreases, then the point 201 shifts in the direction 216 as illustrated as the storage controller 108 inputs updated system load information. As the point 201 shifts in the direction 216, as illustrated in FIG. 2, the point 201 follows the surface of the surface plot 208 upward (in the z direction) corresponding to an increase in the garbage collection rate that is output from the model. This is favorable in this situation because it utilizes more overhead for garbage collection, such as to over-produce free segments to bank up for future periods of higher system load, in a manner that does not interfere with current system load demands.

Looking now at some of the boundary conditions of the model that are illustrated by the surface plot 208 in FIG. 2, when the system is at a minimum number of desired free segments and has an idle system load (e.g., no write I/Os), the garbage collection rate is high relative to other points on the surface plot 208, so that a large amount of system resources may be consumed by the garbage collection overhead. When the system is at a maximum number of desired free segments but the system is still idle for write I/Os, a non-zero garbage collection rate may remain so that system resources may still be consumed by the garbage collection overhead to bank against possible future periods of higher write I/O activity.

Further, when the system is at a maximum load (whether that maximum is determined due to a CPU utilization maximum, or a bandwidth utilization maximum, etc.) and already has a maximum number of desired free segments, then the garbage collection rate may be zero or close to zero. This corresponds to a time where as much of the system resources as possible are allocated to the source of the load (e.g., write I/O in this example) in a manner that avoids load spike amplification. Since there is a maximum number of segments free at this time (banked ahead from a previous time, for example), the system does not yet need to resume garbage collection.

However, as the number of segments free begins to be consumed by write I/Os, it shifts away from the corner of the surface plot 208 and begins tracking back towards the minimum desired number of free segments illustrated in FIG. 2 while the system remains at its maximum system load. At the point of maximum system load and a minimum number of free segments, the garbage collection rate increases to at least produce as many free segments as are needed for current write I/O consumption needs. In this way, the model according to embodiments of the present disclosure enables the system to at least continue to produce sufficient free segments to meet the demands of current write I/O.

As a result of the above, the instantaneous garbage collection rate in a system 102 may dynamically change over time in response to changes in system load and/or availability of free segments in the system. The example model in FIG. 2 as illustrated may only take into account write I/O with respect to the system load. It may be desirable to include other inputs in determining a garbage collection rate as well, for example read I/O.

Figure 3:
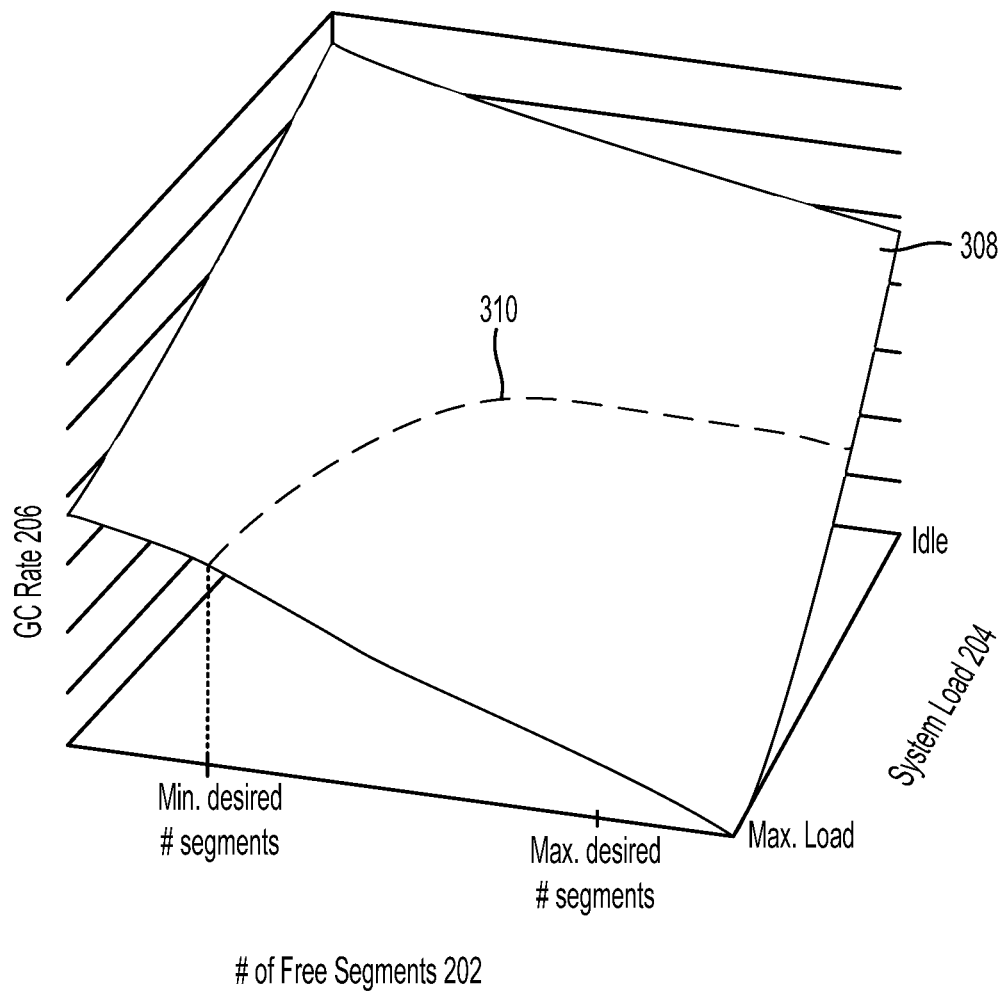
FIG. 3 illustrates an exemplary model according to aspects of the present disclosure.

This is included in FIG. 3, which illustrates an exemplary model 300 according to aspects of the present disclosure. The axes 202, 204, and 206 are as discussed above with respect to FIG. 2. In FIG. 3, however, several changes have been made to take additional load information into consideration.

First, the model represented by the surface plot 308 has been normalized such that the production of free segments through garbage collection (as set by the garbage collection rate) equals the consumption of free segments by write I/Os at the minimum desired number of free segments. This may be represented with a modification to Equation 1 as shown in Equation 2:

$$\text{Garbage Collection Rate} = (\text{LoadHeadRoom}^X + \text{FreeSegmentHeadRoom}^Y) * \text{ScalingFactor}. \quad \text{(Eq. 2)}$$

This is an exemplary equation only. The "ScalingFactor" in Equation 2 may be based on the particular circumstances of a particular system 102, including the garbage collection rate occurring at the point of maximum system load while at the minimum number of free segments desired for the system. For example, where the Garbage Collection Rate from Equation 1 would fail to produce an adequate number of free segments at maximum system load and the minimum existing number of free segments, the ScalingFactor may be set to scale the resulting Garbage Collection Rate to meet the desirable outcome of producing as many free segments as are used for current write I/O consumption.

This point of normalization/scaling, referred to elsewhere as the point at which garbage collection is "pay-as-you-go" (production=consumption), is illustrated on the surface plot 308 by line 310. Points on the surface plot 308 with a z axis 206 height greater than the height at the line 310 represent garbage collection rates that produces more free segments than are currently consumed (free segment space is gained and "banked" for future use), while points with a height less than the height at the line 310 represent garbage collection rates that produce fewer free segments than are currently consumed (free segment space is lost than it is being replenished). Normalization may be performed, for example, as a part of system initialization and takes into consideration the capabilities of the particular system, such as I/O processing speed.

Second, to compensate for the normalizing of the surface plot 308, the model represented by the surface plot 308 may include, in addition to write I/O, other operation burdens that may be imposed on the system. For example, there is certain overhead associated with reads from one or more hosts 104 that, if ignored, renders garbage collection rates according to embodiments of the present disclosure potentially sub-optimal. For garbage collection rates above or below the rate corresponding to line 310 (e.g., line 310's z-axis height) of the surface plot 308, corresponding to points where garbage collection produces free segments approximately at the rate that the write I/O is consuming them, it may be desirable to consider read load when determining the garbage collection rate.

According to embodiments of the present disclosure, the read load may be included in the model but modified so that it is phased out of consideration whenever the overall system load pushes the system to produce free segments at the rate at which they are consumed, whether that is visualized in the surface plot 308 as a proximity to the line 310 or to the minimum desired position on the axis 202. This may be driven by the current free space, such that reads are ignored in the model when there are not extra free segments and fully included by the time the maximum desired number of free segments has been reached. An exemplary way in which to take this into consideration is set forth according to equation 3:

$$\text{LoadHeadRoom} = \text{writes} + \text{reads} * e^{(z * FreeSegmentHeadRoomPercent)}. \quad \text{(Eq. 3)}$$

This is an exemplary equation only; other approaches may also be used to cause read load to be ignored at some points where the number of free segments produced by garbage collection should be made equal the consumption of free segments by write I/Os. As can be seen from Equation 3, the reads at a current point in time may be input into the model. The value for the reads may be scaled by a decaying value (e.g., exponentially, linearly, or otherwise decaying) that, in this example, is exponentially influenced by a percentage value of the number of free segments (e.g., the current number of free segments divided by the maximum desired number of free segments). Thus, as the number of free segments reduces, the weight given to the read load correspondingly decreases, until the read portion is ignored altogether when determining LoadHeadRoom for the garbage collection rate. Further, as larger amounts of free segments are generated, reads are increasingly included in the consideration by the model, so that a heavy read load may slow garbage collection. The resulting value for LoadHeadRoom may be used in Equation 2 (or Equation 1) as discussed above. Further, as result of including a portion of reads (or other overhead) in the LoadHeadRoom, the line 310 illustrated in FIG. 3 may no longer be a line at a constant height on axis 206. Instead, the line 310 (corresponding to a "pay as you go" condition) may skew up or down on the axis 206 as more or less non-write overhead is included according to embodiments of the present disclosure.

As a result of the above, the model represented by the surface plot 308 in FIG. 3 provides an optimal (or near optimal) garbage collection rate for any given condition of the storage system 102. For example, by normalizing the surface plot 308 at the minimum desired number of free segments (and maximum system load), embodiments of the present disclosure normalize the plot to the worst case point for the given system characteristics. Further, the model remains tunable by changing the values of X (e.g., corresponding to write load), Y (e.g., corresponding to free segments), and now Z (e.g., corresponding to total load) in the model. The resulting garbage collection rates, as determined by the current system load and free segment information, are gradual in nature so as to provide smooth adjustments to change (i.e., no step-function-like changes in performance). Also, the model produces good marginal behavior, for example the increase/decrease in garbage collection rate depending upon the current point on the surface plot 308 matches what may be intuitively desirable.

Other inputs may similarly be considered just like read load in FIG. 3 (either in addition to or in the alternative). For example, though the model according to FIG. 3 takes into consideration reads such as those imposed by a flash read cache (FRC) in systems that include FRC, collaboration with the FRC's bulk load reads could be increased. This may be accomplished, for example, by flagging FRC bulk load I/Os so that these may be counted extra towards the read load. For example, if the FRC is doing 100 MB/s of reads, the model for garbage collection pacing may scale this to be seen as 200 MB/s of reads to the model. As a result, the determined garbage collection rate slows down more than would otherwise be the case (aside from situations where close to/at the line 310 where reads are ignored anyway according to FIG. 3).

In an alternative embodiment, instead of exaggerating the quantity of reads in Equation 3, the Equation 3 could further include a third I/O type, referred to herein simply as an imaginary I/O. The imaginary I/O could be scaled similarly as the read input (e.g., exponentially decaying the imaginary I/O just as the read input was exponentially decayed in Equation 3). Thus, the FRC may, instead of being counted as a read, be taken as a request to slow down garbage collection from an external component. The model takes this request into consideration where that can be done so safely, but still ignores it when close to or at the minimum desired number of segments along the axis 202. The concept of imaginary I/O could also be used to briefly address short-term issues with service level agreements (SLAs), such as where the storage system 102 is briefly struggling to comply with an SLA. When having difficulty complying with the SLA, the storage controller 108 may report a high amount of imaginary I/O as an input to the model. As a result, the garbage collection model will include a portion of this imaginary I/O (as specified by how it is scaled, such as the exponential decay driven by current free segments of Equation 3) when determining the current system load.

In another alternative embodiment, the FRC may correspond with the model to influence the garbage collection rate or its own FRC load. For example, the FRC may check the current garbage collection rate output from the model and set the FRC load pace based on a prediction of the garbage collection rate slowing down. As another example, the FRC may communicate a request to the model to reduce the garbage collection rate, which the model may comply with except in situations that would case garbage collection to produce less free segments than the current write I/Os need to consume. As another example, the storage controller 108 may further include a coordinator that may coordinate between the FRC and the model, such that the FRC may query the coordinator how much I/O the FRC may engage in at a given time, and the coordinator may check the system load, the current garbage collection situation (number of free segments and rate, for example), and respond with a value.

By increasing the coordination between a FRC and the garbage collection function of the storage system 102, under any of the above exemplary alternatives, several improvements to the storage system 102 become visible. From the perspective of a host 104, the storage system 102's read latency may improve as the FRC starts servicing reads more quickly. From the perspective of the FRC itself, data loads may be processed more quickly. From the perspective of the storage devices 106 (e.g., where they are hard disk drives), faster servicing of I/Os by the FRC results in fewer I/Os going to the storage devices 106 which improves the wear life of the storage devices 106. From the perspective of overall system throughput, fewer head seeks may result from background activities becoming more batch-oriented. Finally, garbage collection is throttled to cause an overall reduction in read traffic at an indirection layer of the storage system 102.

Other example inputs may be included as well or in the alternative to FRC. For example, reconstruction activities may also be taken into consideration in a similar manner as read load, or more generally any other background activities occurring at the storage system 102 that may have an impact on any system load aspect such as bandwidth, CPU utilization, etc. As a result of the foregoing, a general purpose mechanism may be provided to enable garbage collection to collaborate with one or more other system activities (such as host I/O, FRC, reconstruction, etc.). By scaling the inclusion of any one or more of these activities such that they are gradually ignored as the minimum number of free segments is approached, embodiments of the present disclosure enables garbage collection to deterministically respond to the load of these one or more other system activities to the extent that garbage collection may safely do so (i.e., without running out of free segments for write I/O consumption).

Figure 4:
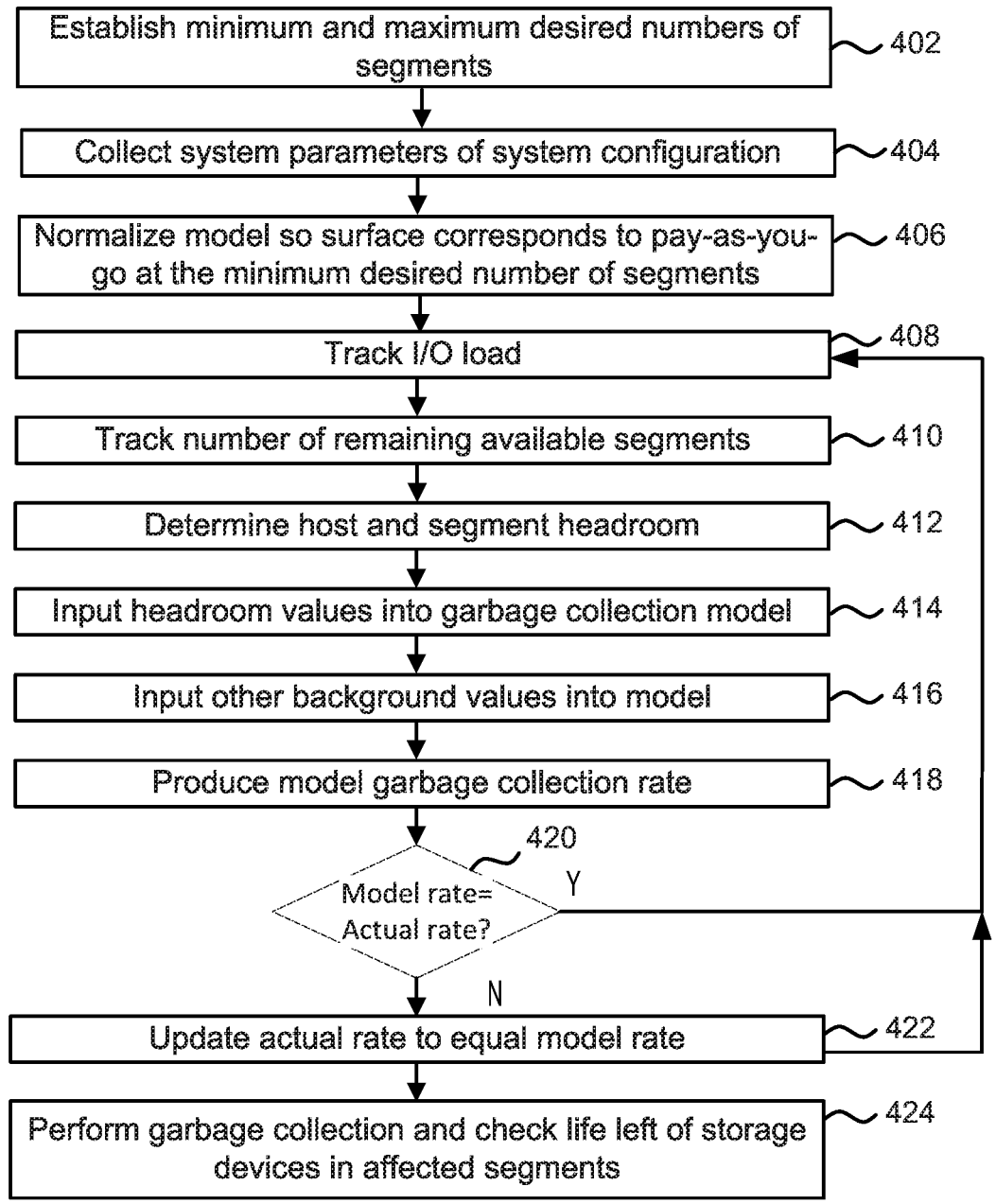
FIG. 4 is a flow diagram of a method for dynamically and smoothly adjusting the garbage collection rate according to aspects of the present disclosure.

FIG. 4 is a flow diagram of a method 400 for dynamically and smoothly adjusting the garbage collection rate according to aspects of the present disclosure. In an embodiment, the method 400 may be implemented by one or more processors of one or more of the storage controllers 108 of the storage system 102, executing computer-readable instructions to perform the functions described herein. In the description of FIG. 4, reference is made to a storage controller 108 (108.a or 108.b) for simplicity of illustration, and it is understood that other storage controller(s) may be configured to perform the same functions when performing a pertinent requested operation. It is understood that additional steps can be provided before, during, and after the steps of method 400, and that some of the steps described can be replaced or eliminated for other embodiments of the method 400.

At block 402, the storage controller 108 establishes a minimum desired number of free segments in the storage devices 106. This may be stored, for example, in the metadata store 116 of FIG. 1 (or some other cache of the storage controller 108). The storage controller 108 also establishes a maximum desired number of free segments in the storage devices 106. This value may be stored in the same cache/location as the minimum number. These values may be set by the storage system 102 (or, in an alternative embodiment, by a managing entity, such as server 114 where it has management functions), such as automatically based on the reported characteristics/capabilities of the particular storage system 102.

For example, the maximum desired number of free segments may depend upon the endurance characteristics of the storage devices 106. As garbage collection produces more and more free segments, the candidates for garbage collection may become increasingly inferior in terms of a higher cost for garbage collection for the amount of free space obtained in return. Further, garbage collection typically imposes some amount of data transfer on the storage devices 106 where the selected segment(s) are located, and thus impacts the endurance life of those storage devices 106. Thus, there may be times where the system 102 is idle, and could support a higher garbage collection rate, but would process on increasingly inferior candidates that would impose excessive overhead and/or impact endurance on lower-endurance media. As a result, the maximum desired number of free segments may be set bearing this in mind so that the quality of candidates for garbage collection, and the impact on storage device endurance, is managed.

At block 404, the storage controller 108 collects one or more system parameters of the storage system 102. These are parameters associated with the particular capabilities of the storage system 102, such as how fast it can perform I/O operations. The storage controller 108 may further note the maximum system load capabilities of the storage system 102 (e.g., CPU utilization maximum, bandwidth maxima, etc.).

At block 406, the storage controller 108 may normalize the garbage collection rate model so that the garbage collection rate output at the minimum number of free segments specified at block 402 (e.g. as illustrated with the surface plot 308 of FIG. 3) corresponds to a pay-as-you-go production so that the production of free segments at the specified garbage collection rate equals the consumption of free segments by the write I/O load at that point.

The operations described with respect to blocks 402 through 406 may occur at an initial time of system initialization, and/or during system operation such as during a recalibration process.

At block 408, the storage controller 108 tracks the current I/O load. In an embodiment, this may include the load on the CPU, such as measured by the CPU utilization, and/or other metrics such as disk bandwidth and memory bandwidth to name just a few examples. Further, this may be limited to include only writes in some embodiments, while in other embodiments reads are taken, entirely or in part, into consideration and potentially other aspects such as compliance with service level agreements and flash read cache interactions.

At block 410, which may be simultaneous to tracking the I/O load or substantially simultaneous thereto, the storage controller 108 tracks the number of free segments currently available.

At block 412, in embodiments where the model uses load headroom and segment headroom as inputs, the storage controller 108 determines the host headroom and the free segment headroom. This is determined by subtracting the current I/O load from the maximum system load possible for host headroom and subtracting the current number of free segments from the maximum desired number of free segments.

At block 414, the storage controller 108 inputs the host and segment headroom values into the model to determine a garbage collection rate for that point in time. In embodiments where the model doesn't rely on the headroom values but rather the raw values, the tracked system load and free segment values are input into the model.

At block 416, the storage controller 108 inputs one or more other background values into the model. Continuing with this example, read load may be included as discussed above with respect to FIG. 3. Further or in the alternative, FRC operation information may be input into the model as well as a value influenced by deviation from a service level agreement.

At block 418, the storage controller 108 processes the values input into the model to produce a garbage collection rate. This may include a normalization (scaling) factor as discussed above. As discussed above with respect to the exemplary Equations 1, 2, and 3, the garbage collection rate may also take into account additional system load factors such as read load when determining the garbage collection rate.

At decision block 420, the storage controller 108 determines whether the garbage collection rate output from the garbage collection model equals the current rate implemented for garbage collection (where garbage collection is already active in the storage system 102). If the rate output from the model equals the currently implemented rate, then the method 400 returns to block 408 to continue tracking, determining, and inputting the values into the model to generate updated rates.

If at decision block 420 it is instead determined that the rates differ, then the method 400 proceeds to block 422. At block 422, the storage controller 108 updates the current rate implemented for garbage collection to equal the rate output from the model. The method 400 then returns to block 408 to proceed again as discussed above.

During blocks 408-422, garbage collection may occur as discussed with respect to block 424 of method 400. This may include, for example, identifying one or more segments that are ready for garbage collection such as may be indicated by a dereference command that is tracked for the segments in the system. After identifying the segment for garbage collection, the storage controller 108 identifies data (e.g., old data) that is still valid (e.g., has not been overwritten yet) amidst the data identified as invalid and reads that still-valid data from the segment. The still-valid data is written to a new place on a new segment. In some embodiments, a replica is also written to the next available place. Metadata may be updated in the metatdata store 116 when garbage collection is done. The old, now garbage-collected segment is marked as free and eligible for re-use.

In some embodiments, the storage controller may, at the time of garbage collection for a selected segment, check the life of the storage devices 106 associated with the selected segment (that may include, for example, multiple storage devices 106 for data stripes in a DDP). For example, prior to rewriting the still-valid data to a new segment, the storage controller 108 may check the projected time of failure for the storage devices 106 used for the selected segment. This may be obtained, for example, based on the tracked usage of the storage devices 106 over time (e.g., a number and/or size of I/Os to the storage devices compared to a predicted total number for the particular storage devices). If one of the storage devices 106 associated with the selected segment is close to the projected time of failure (e.g., number of I/O close to the predicted total number of I/Os the storage device 106 can support before failure), the storage controller 108 may remove that aging storage device 106 from association with the selected segment. The threshold for triggering a determination that the age is close to the projected time of failure may assume many different values, for example a percentage value of the age to projected failure (e.g., 80%, 90%, 95% to name just a few examples), or a number of I/Os over the lifetime, etc.

The storage controller 108 then replaces the removed storage device 106 with a different storage device 106, such as that is available in the DDP. By replacing an aging storage device 106 in this manner, no reconstruction is required when the aging storage device 106 is replaced because the segment has already been garbage collected and thus no longer has valid data anyway. Though the aging storage device 106 is removed from the currently selected segment for garbage collection, the same aging storage device 106 may be associated with many other segments in the storage system 102. Thus, the removal of the aging storage device 106 may be a gradual process of proactively evacuating the aging storage device 106, instead of an all-or-nothing abandonment of the aging storage device 106.

Though an aging storage device 106 may be slowly disassociated with active segments, it may still be used advantageously to store data for servicing I/O while not relying on it for data protection purposes. For example, as a given aging storage device 106 (as this may be applicable to any number of storage device 106, with one described for simplicity of discussion) becomes more and more evacuated according to the above description, the workload on the aging storage device 106 correspondingly decreases, effectively extending its working life (or, rather, extending its projected time of failure further into the future). The aging storage device 106 therefore may get additional time before projected failure, but may be less trustworthy due to the increased likelihood of failure sooner than other, less aged storage devices 106. In addition, or alternatively, to being less trustworthy, the aging storage device 106 may have a limited amount of data transfer life remaining before failure, i.e. were a RAID stripe stored on the aging device 106, a RAID reconstruct may cost more in terms of data transfer requirements than what remains available to the aging storage device 106 before failure.

According to embodiments of the present disclosure, the aging storage device 106 may instead be used to store non-RAID protected replicas of data that is being written to the storage system 102 (e.g., replicas that assist in increasing parallel access to data and/or physically/geographically closer proximity to one or more requesting hosts 104). This written data may come from one or more host 104 writes or from still-valid data from garbage collection (and the written data, in addition to the replica, may still be written in a RAID-protected segment such that the primary copy of the data is not altered or lessened in its protection level as a consequence of the replica on the aging storage devices 106). By creating the replica with data currently being written, the cost of creating the replica may be limited to the data transfer to the aging storage devices 106 (also referred to sometimes as "near death storage devices"), without any extra read operations taxing the system to create the replica. Further, the data chosen to be placed in the replica may be selected to achieve additional goals, including lightening the loads on particular storage devices 106 (which may include selection for data to replicate may be limited to those particular storage devices 106). This may assist in both using the last available life from aging storage devices 106 as well as improving wear management on the particular storage devices 106.

A few bits in an identifier of data, e.g. a blob ID as discussed above with respect to FIG. 1, may be reserved to identify duplicate copies of the same data (e.g., the replica(s) on the aging storage devices 106), which may be used to serve tiering, cloud caching, or replicas. When the identifier is accessed in the metadata store 116, the search may generally ignore these reserved bits and return data locations for the available copies, including the replicas on the aging storage devices 106. The data being sought may then be read from whichever copy may be preferred, including the replicas stored on the aging storage devices 106 (until the aging devices fail). By doing this, the read load to the primary (e.g., RAID protected) segment copy of the data, thereby extending that wear life. In some embodiments, checksums (and/or other mechanisms) may also be embedded to protect against such potential issues as silent corruption, dropped writes, etc. As result, even when the risk of data corruption is higher with aging storage devices 106, it can be easily detected so that the storage controller 108 may fall back to the primary copy of the data (instead of the replica at the aging storage devices 106).

Continuing with the example of checking the life of storage devices 106 associated with a selected segment and their migration/subsequent use, these embodiments of the present disclosure may be further used as a basis for dynamic migration between RAID and replicas as a system ages with a mix of older and newer storage devices 106 (e.g., as compared to each other). Thus, the storage system may initially begin with RAID-based protection, then before wear-based failures start to occur (e.g., based on tracking and checking the estimated life during system operation as mentioned above) shift the most-used storage devices 106 to a replica protection configuration. When new storage devices 106 are then introduced into the system, they may again rely on RAID protection.

Thus, the tracking and checking of storage device 106 age during garbage collection may be used to assist in detecting and better utilizing storage devices 106 that may be near the end of their useful lives. This may further allow storage devices 106 in aging (e.g., retired) storage systems to be connected to a current storage system 102 (e.g., as one or more expansion trays) so that aging storage devices 106 in those aging storage systems may be further utilized until they fail. This would enable an operator of those aging storage systems to obtain additional use and life out of their investment, as well as provide an endurance benefit in the form of lower replacement rates (for example) for the newer storage devices in the storage system 102.

The method 400, for example from blocks 408 through 422, may cycle repeatedly while garbage collection operations at block 424 continue (as described with one or more aspects of block 424 for example continuously or at set intervals).

As a result of the elements discussed above, embodiments of the present disclosure improve upon storage system technology. For example, a storage system's performance is improved by solving the issue of load spike amplification when using garbage collection during system operation to recover storage segments as free space. Thus, garbage collection may proceed at higher rates (e.g., to "bank" up free segments) at times of low system load/idle and at lower rates (or stop) at times of high system load in a manner that is complementary to system load from write and/or read load. This is achieved by pacing the garbage collection rate based on the instantaneous (or average from a prior segment of time where it is periodic) system load and free segment information. Further, the system's use of the model (e.g., as illustrated by the surface plots of FIGS. 2 and 3) produces gradual changes in rate so as to provide smooth adjustments to system change (i.e., no step-function-like changes in performance). Also, the system's use of the model produces good marginal behavior, for example the increase/decrease in garbage collection rate matches what may be intuitively desirable.

In some embodiments, the computing system is programmable and is programmed to execute processes including the processes of method 400 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
tracking, by a storage controller, an input/output (I/O) load on the storage controller and an amount of free storage segments available in a storage device associated with the storage controller;
determining, by the storage controller during I/O operation, a garbage collection rate for generating free segments in the storage device based on the tracked I/O load and the amount of free storage segments, wherein the garbage collection rate increases in response to a write activity of the tracked I/O load decreasing, and decreases in response to the write activity of the tracked I/O load increasing; and
adjusting, by the storage controller, performance of garbage collection to the determined garbage collection rate.

2. The method of claim 1, wherein, for a given amount for the tracked I/O load, the garbage collection rate increases in response to the tracked amount of free storage segments decreasing and decreases in response to the tracked amount of free storage segments increasing.

3. The method of claim 1, wherein the determining is further based on a read load on the storage controller, the method further comprising:
modifying, by the storage controller, the read load with a decaying factor based on the tracked amount of free storage segments, the decaying factor decreasing as the tracked amount of free storage segments decreases and increasing as the tracked amount of free storage segments increases.

4. The method of claim 1, wherein the determining is further based on a background activity of the storage controller, the method further comprising:
modifying, by the storage controller, an amount corresponding to the background activity with a decaying factor based on the tracked amount of free storage segments.

5. The method of claim 1, further comprising:
tuning, by the storage controller, at least one parameter of a production rate model used for the determining to modify a responsiveness of the storage controller to one or more inputs.

6. The method of claim 1, further comprising:
normalizing, by the storage controller, a production rate model used for the determining so that the determined garbage collection rate equals a consumption amount from the tracked I/O load at a maximum system I/O load when the tracked amount of free storage segments equals a minimum desired amount of free storage segments.

7. The method of claim 1, further comprising:
using, by the storage controller, a storage device from among one or more storage devices that is close to a projected time of failure for storing non-protected replicas of data.

8. A non-transitory machine readable medium having stored thereon instructions for performing a method comprising machine executable code which when executed by at least one machine, causes the machine to:
track an input/output (I/O) load on the machine and an amount of free storage segments available in a storage device associated with the machine;
determine, during I/O operation, a garbage collection rate for generating free segments in the storage device based on the tracked I/O load and the amount of free storage segments, wherein the garbage collection rate increases in response to a write activity of the tracked I/O load decreasing, and decreases in response to the write activity of the tracked I/O load increasing; and
adjust performance of garbage collection to the determined garbage collection rate.

9. The non-transitory machine readable medium of claim 8, wherein, for a given amount for the tracked I/O load, the garbage collection rate increases in response to the tracked amount of free storage segments decreasing and decreases in response to the tracked amount of free storage segments increasing.

10. The non-transitory machine readable medium of claim 8, wherein the determination is further based on a read load on the machine, further comprising machine executable code that causes the machine to:
modify the read load with a decaying factor based on the tracked amount of free storage segments, the decaying factor decreasing as the tracked amount of free storage segments decreases and increasing as the tracked amount of free storage segments increases.

11. The non-transitory machine readable medium of claim 8, wherein the determination if further based on a background activity of the machine, further comprising machine executable code that causes the machine to:
modify an amount corresponding to the background activity with a decaying factor based on the tracked amount of free storage segments.

12. The non-transitory machine readable medium of claim 8, further comprising machine executable code that causes the machine to:
tune at least one parameter of a production rate model used for the determination to modify a responsiveness of the machine to one or more inputs.

13. The non-transitory machine readable medium of claim 8, further comprising machine executable code that causes the machine to:
normalize a production rate model used for the determination so that the determined garbage collection rate equals a consumption amount from the tracked I/O load at a maximum system I/O load when the tracked amount of free storage segments equals a minimum desired amount of free storage segments.

14. The non-transitory machine readable medium of claim 8, further comprising machine executable code that causes the machine, as part of the garbage collection, to:
use a storage device from among one or more storage devices that is close to a projected time of failure for storing non-protected replicas of data.

15. A computing device comprising:
a memory containing machine readable medium comprising machine executable code having stored thereon instructions for performing a method of dynamically adjusting a garbage collection rate during input/output (I/O) operation; and
a processor coupled to the memory, the processor configured to execute the machine executable code to cause the processor to:
track an I/O load on the computing device and an amount of free storage segments available in a storage device associated with the computing device;
determine, during the I/O operation, the garbage collection rate for generating free segments in the storage device based on the tracked I/O load and the amount of free storage segments, wherein the garbage collection rate increases in response to a write activity of the tracked I/O load decreasing, and decreases in response to the write activity of the tracked I/O load increasing; and
adjust performance of garbage collection to the determined garbage collection rate.

16. The computing device of claim 15, wherein, for a given amount for the tracked I/O load, the garbage collection rate increases in response to the tracked amount of free storage segments decreasing and decreases in response to the tracked amount of free storage segments increasing.

17. The computing device of claim 15, wherein the determination is further based on a read load on the computing device, the machine executable code further causing the processor to:
modify the read load with a decaying factor based on the tracked amount of free storage segments, the decaying factor decreasing as the tracked amount of free storage segments decreases and increasing as the tracked amount of free storage segments increases.

18. The computing device of claim 15, wherein the determination is further based on a background activity of the computing device, the machine executable code further causing the processor to:
modify an amount corresponding to the background activity with a decaying factor based on the tracked amount of free storage segments.

19. The computing device of claim 15, the machine executable code further causing the processor to:
normalize a production rate model used for the determination so that the determined garbage collection rate equals a consumption amount from the tracked I/O load at a maximum system I/O load when the tracked amount of free storage segments equals a minimum desired amount of free storage segments.

20. The computing device of claim 15, the machine executable code further causing the processor, as part of the garbage collection, to:
use a storage device from among one or more storage devices that is close to a projected time of failure for storing non-protected replicas of data.

* * * * *